(12) United States Patent
Allen

(10) Patent No.: US 11,476,624 B1
(45) Date of Patent: Oct. 18, 2022

(54) SELF-CONTAINED BOXLESS ELECTRICAL RECEPTACLE SYSTEM WITH PRE-CONFIGURED EMBEDDED CONDUCTORS

(71) Applicant: Walter Allen, Binghamton, NY (US)

(72) Inventor: Walter Allen, Binghamton, NY (US)

( * ) Notice: Subject to any disclaimer, the term of this patent is extended or adjusted under 35 U.S.C. 154(b) by 0 days.

(21) Appl. No.: 17/395,628

(22) Filed: Aug. 6, 2021

(51) Int. Cl.
*H01R 13/44* (2006.01)
*H01R 25/00* (2006.01)
*H01R 24/78* (2011.01)

(52) U.S. Cl.
CPC .......... *H01R 25/006* (2013.01); *H01R 13/44* (2013.01); *H01R 24/78* (2013.01)

(58) Field of Classification Search
CPC ....... H01R 25/006; H01R 13/44; H01R 24/78
See application file for complete search history.

(56) References Cited

U.S. PATENT DOCUMENTS

| | | |
|---|---|---|
| 4,210,772 A | 7/1980 | Magana et al. |
| 4,295,018 A | 10/1981 | Borrelli |
| 4,918,258 A | 4/1990 | Ayer |
| 5,052,935 A | 10/1991 | James et al. |
| 5,326,933 A | 7/1994 | Freundner et al. |
| 5,399,806 A | 3/1995 | Olson |
| 5,525,754 A | 6/1996 | Akins |
| 5,785,551 A | 7/1998 | Libby |
| 6,201,187 B1 | 3/2001 | Burbine |
| 6,563,049 B2 | 5/2003 | May |
| 6,843,680 B2 * | 1/2005 | Gorman ............... H01R 13/512 439/535 |
| 6,870,099 B1 | 3/2005 | Schultz et al. |
| 7,148,419 B1 | 12/2006 | Harrigan |
| 9,825,447 B1 | 11/2017 | Gorman |
| 10,116,073 B2 | 10/2018 | Washino et al. |
| 10,170,878 B1 | 1/2019 | Reulman, Sr. |
| 10,390,447 B1 | 8/2019 | McGee |
| 2005/0272305 A1 | 12/2005 | Gorman |
| 2007/0268655 A1 | 11/2007 | Price et al. |
| 2013/0012048 A1 | 1/2013 | Pyrros |
| 2013/0045624 A1 | 2/2013 | Snyder |

(Continued)

FOREIGN PATENT DOCUMENTS

| | | | |
|---|---|---|---|
| GB | 1402861 A | 8/1975 | |
| GB | 1478111 A | 6/1977 | |
| WO | WO-2014070846 A1 * | 5/2014 | ............... G05F 3/02 |

OTHER PUBLICATIONS

International Search Report and Written Opinion dated Nov. 17, 2021 cited in Application No. PCT/US21/44906, 7 pgs.

*Primary Examiner* — Tho D Ta
(74) *Attorney, Agent, or Firm* — Bekiares Eliezer LLP

(57) ABSTRACT

A novel system for installing, wiring and controlling electrical outlets is disclosed. The system includes a mounting bracket, a self-contained receptacle, and an option control module. The mounting bracket has preconfigured embedded conductors to facilitate the mounting of electrical outlets thereto. The self-contained receptacle includes a self-contained electrical outlet having face-mounted counter bored connecting screws for electrically connecting the self-contained receptacle to the embedded conductors of the mounting bracket. The optional control module may wirelessly receive instructions for controlling an electrical output of the self-contained receptacle.

15 Claims, 12 Drawing Sheets

(56) References Cited

U.S. PATENT DOCUMENTS

2014/0054060 A1* 2/2014 Smith .................. H05K 5/03
 174/66
2017/0187155 A1 6/2017 Jansen et al.

* cited by examiner

SELF-CONTAINED BOXLESS ELECTRICAL RECEPTACLE SYSTEM WITH PRE-CONFIGURED EMBEDDED CONDUCTORS

RELATED APPLICATION

Under provisions of 35 U.S.C. § 119(e), the Applicant claims benefit of U.S. Provisional Application No. 63/186,340 filed on May 10, 2021, which is incorporated herein by reference in its entirety.

It is intended that the referenced application may be applicable to the concepts and embodiments disclosed herein, even if such concepts and embodiments are disclosed in the referenced application with different limitations and configurations and described using different examples and terminology.

FIELD OF DISCLOSURE

The present disclosure generally relates to outlets, switches, and other electrical receptacles.

BACKGROUND

Wiring outlets and other electrical receptacles is a cumbersome, dangerous, and time-consuming process. The process of wiring an electrical receptacle remains relatively unchanged for the past century.

During home construction, an electrician typically mounts electrical junction boxes throughout a home, and "rough" wiring for each receptacle, whereby wire (e.g., 12 and/or 14 gauge wire) may be run to the junction box, pulled through an opening in the junction box, and wrapped back into the box so that remaining construction (e.g., wall board installation etc.) can be completed while the wires for each receptacle remain accessible At a later time, the electrician returns to the "rough wired" junction box and completes installation of a switch, outlet or other receptacle. During the installation process, the electrician strips insulation from a portion of the wires run to the junction box, creates "tails" (e.g., conductive leads to connect the wires to a receptacle being installed), connects each of the tails to a respective wire run to the junction box using wire nuts, and connects the tails to respective connection points on the electrical receptacle. The connected wires and tails are then pushed into the junction box along with at least a portion of the receptacle, which is attached to the junction box using mounting screws.

The receptacles themselves are wear parts and will need to be replaced sometime in the future. Twisting and forming copper conductors (e.g., using wire nuts, connecting the wires to the receptacles, and pushing the wires into the junction box) causes work hardening of the wires and tails, which can cause wires to break when being reworked to install replacement receptacles. Additionally, conventional receptacles include connecting screws that are necessarily exposed so that the receptacle can be connected to the home wiring. When a homeowner removes outlet covers (e.g., to paint walls), the homeowner is exposed to risk of electrical shock from the exposed connecting screws.

Brief Overview

A self-contained boxless electrical receptacle system with pre-configured embedded conductors may be provided. This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

A self-contained boxless electrical receptacle system includes three main components: a mounting bracket having preconfigured embedded conductors to facilitate the mounting of electrical outlets, a self-contained electrical outlet with face-mounting counter bored connecting screws, and a wireless control module. Using these components, common household electrical wiring may be accomplished in less time and using fewer materials. The wireless control module eliminates need for control wiring for smart home applications.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

In the drawings:

FIG. 1 is an illustration of a self-contained boxless electrical receptacle system consistent with the present disclosure;

FIG. 2 is a first schematic layout for circuitry associated with a mounting bracket of the self-contained boxless electrical receptacle system consistent with the present disclosure;

FIG. 3 is a second schematic layout for circuitry associated with a mounting bracket of the self-contained boxless electrical receptacle system consistent with the present disclosure;

FIG. 4 is a third schematic layout for circuitry associated with a mounting bracket of the self-contained boxless electrical receptacle system consistent with the present disclosure;

FIG. 5 is a fourth schematic layout for circuitry associated with a mounting bracket of the self-contained boxless electrical receptacle system consistent with the present disclosure;

FIG. 6 is a fifth schematic layout for circuitry associated with a mounting bracket of the self-contained boxless electrical receptacle system consistent with the present disclosure;

FIG. 7 is an illustration of a mounting bracket for the self-contained boxless electrical receptacle system;

FIG. 8 is an illustration of a receptacle for the self-contained boxless electrical receptacle system;

FIG. 9 is a first schematic layout for the receptacle of FIG. 8;

FIG. 10 is a second schematic layout for the receptacle of FIG. 8;

FIG. 11 is an illustration of a control module for the self-contained boxless electrical receptacle system; and FIG. 12 is a schematic layout for the control module of FIG. 11.

DETAILED DESCRIPTION

Figure 1:
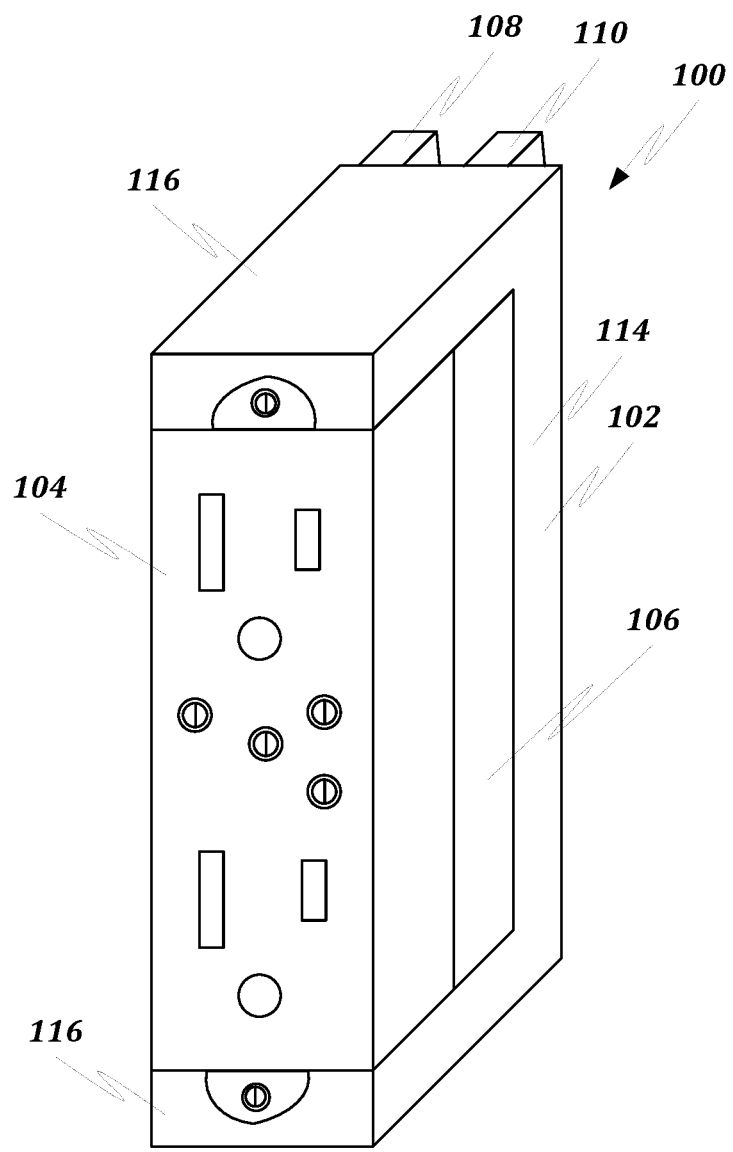

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. It will be readily understood that the components of the self-contained boxless electrical receptacle system, as generally described and illustrated in the drawings herein, could be arranged and designed in a wide variety of configurations. Thus, the following more detailed description of the embodiments of the system, as represented in the drawings, is not intended to be a limitation of the scope, but is merely representative of various embodiments of the self-contained boxless electrical receptacle system.

The present disclosure includes many aspects and features. Moreover, while many aspects and features relate to, and are described in, the context of self-contained boxless electrical receptacle system, embodiments of the present disclosure are not limited to use only in this context.

Consistent with embodiments of the present disclosure, a self-contained boxless electrical receptacle system may be provided. This overview is provided to introduce a selection of concepts in a simplified form that are further described below. This overview is not intended to identify key features or essential features of the claimed subject matter. Nor is this overview intended to be used to limit the claimed subject matter's scope. The self-contained boxless electrical receptacle system may be used by individuals or companies to install electrical receptacles into a residence or other building.

The self-contained boxless electrical receptacle system allows for faster installation of electrical receptacles in a building, such as a residential home. The self-contained boxless electrical receptacle system may include a mounting bracket, a self-contained electrical receptacle, and a control module.

The mounting bracket may be used to facilitate mounting an electrical receptacle to a building structure. For example, the mounting bracket may be attachable to a stud within a wall. The mounting bracket may further include embedded conductors to for conducting electricity from wiring within a building to an electrical switch, outlet, etc.

The self-contained electrical receptacle may include with face-mounted connecting screws for connecting electrical contacts of the receptacle to one or more contact points associated with the embedded conductors of the mounting bracket. The screws are preferably counter-bored to help mitigate risk of a person (e.g., a homeowner, or installer) coming into contact with the screw.

In some embodiments, the self-contained boxless electrical receptacle system may include a control module. The control module may be used with one or more smart home applications for controlling functionality of the receptacle. The control module is preferably wireless, eliminating need for any control wiring to the receptacle.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and subcombinations described in the detailed description.

FIG. 1 illustrates a front perspective view of a self-contained boxless electrical receptacle system 100. The system 100 may include a mounting bracket 102, a receptacle 104 and, optionally, a control module 106.

The mounting bracket 102 is used to mount the system 100 to a building, such as a residential building, an office building, or the like. As shown in FIG. 1, the mounting bracket 102 may be attached to a stud or other support structure within the building. In embodiments, the bracket 102 may be affixed to the support using mechanical fasteners, such as nails, screws, and/or staples. Additionally or alternatively, the bracket 102 may be affixed to the support using chemical fasteners, such as adhesive, epoxy, and/or resin. There are many way in which the mounting bracket 102 may be affixed to the support structure.

The mounting bracket 102 may include one or more connectors 108 for receiving wires connected to electrical wiring in the building. In embodiments, each connector 108 may include a plurality of ports. For example, as illustrated in FIG. 1, the connector 108 may include three ports. In other embodiments, the connector 108 may include more or fewer ports without altering the scope of the disclosure. Electrical conductors or wiring from a building circuit breaker panel or from another electrical box can be brought to and connected at any of (or each of) the ports of the connector 108. These electrical connections or ports are then electrically coupled to the electrical receptacle 104 via embedded circuitry 112, as will be discussed more fully below. In embodiments, the embedded circuitry 112 may comprise preconfigured circuitry for facilitating a connection between the electrical wiring in the building and the electrical receptacle 104.

In one embodiment, each of the ports is configured to receive a multi-wire electrical conductor. In particular, each of the ports may be configured to receive a corresponding individual wire from the multi-wire electrical conductor.

For example, each port may include guides which define individual slots, collars, or other guide structures. Each of the guide structures may be configured to receive an individual wire from the multi-wire electrical conductor. As an example, the multi-wire electrical conductor may be a nonmetallic-sheathed cable, such as a Romex cable, with three or four individual wires within the sheath. Typically, nonmetallic-sheathed cable includes a "hot" wire, a "neutral" wire, and a "ground" wire. In some cases, a fourth wire carrying a "second hot" wire is also included in the nonmetallic-sheathed cable.

In some embodiments, one or more of the connectors 108 may include a wire cover 110 configured to cover one or more wires retained in the connector ports. In some embodiments, the wire cover 110 may be a single cover configured to cover the wires retained in all ports of the connector 108. In some embodiments, the wire cover 110 may be hinged at one end on a surface of the mounting bracket 102. The wire cover 110 may be moved away from the surface of the mounting bracket 102 to accommodate bringing the multi-wire electrical conductor into each of the ports. Once multi-wire electrical conductor is in place within the ports, the wire cover 110 may be moved toward the surface of the mounting bracket 102 and snapped or otherwise secured to the surface of the mounting bracket. Wire covers 110 may be configured in a variety of ways.

Additionally, the mounting bracket 102 may include a back portion 114 and one or more support structures 116 for supporting and at least partially surrounding the electrical receptacle 104 and, optionally, the control module 106. The support structure 116 may be formed as a protrusion from the back portion 114, and may include a structure to facilitate attachment of the electrical receptacle 104 and/or the control module 106 to the mounting bracket 102. As a particular example, the support structure 116 may include a threaded hole for receiving a screw used to retain the electrical receptacle 104 and/or the control module 106 in the mounting bracket 102.

Figure 2:
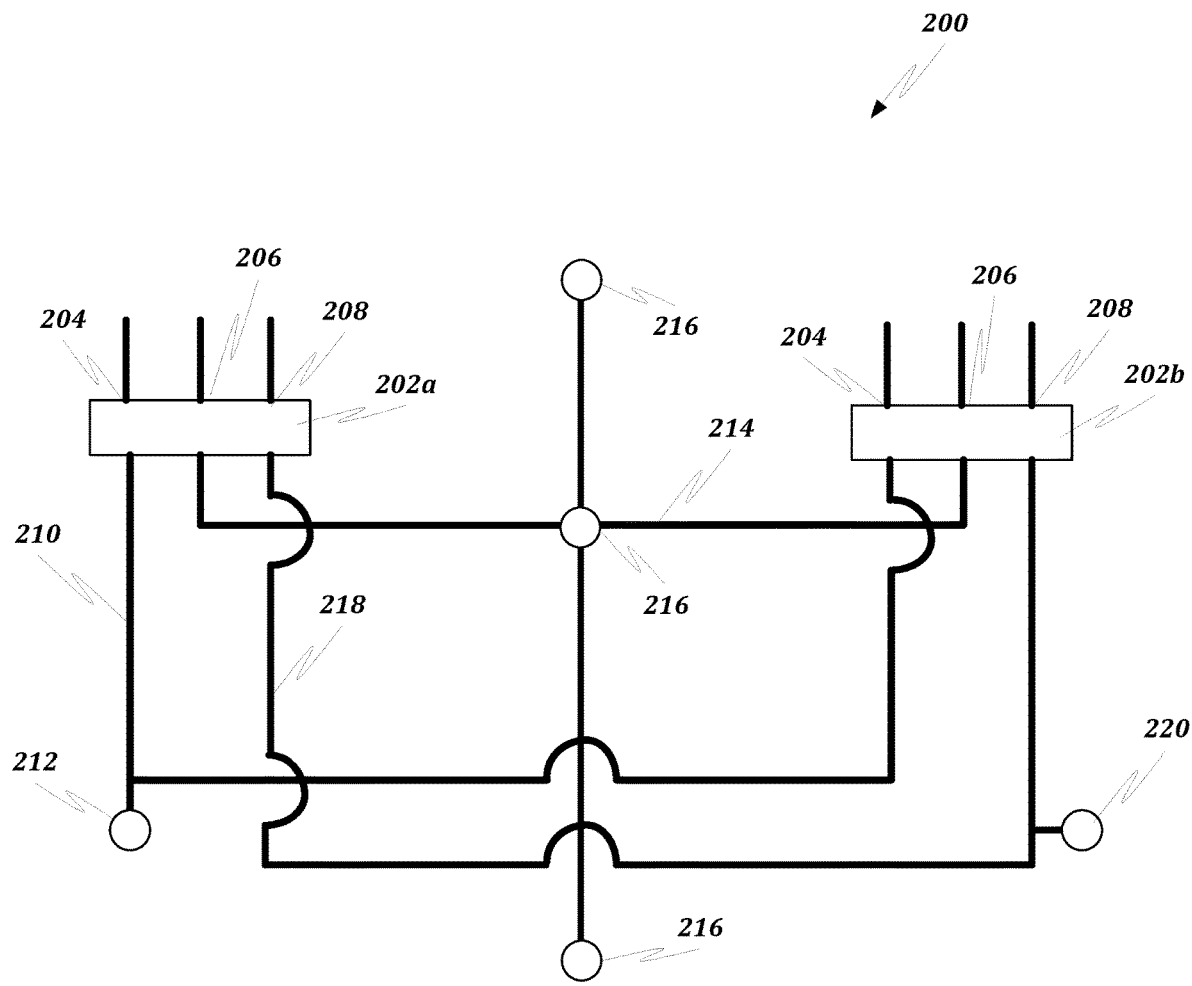

As discussed above, the mounting bracket 102 includes embedded circuitry 112 for conducting electrical signals from the multi-wire electrical conductor to the electrical receptacle 104. FIG. 2 shows a first schematic layout 200 of the embedded circuitry 112. The layout 200 is useful for a receptacle such as a switch or outlet that is to be installed alone or in parallel with another receptacle on a circuit. As shown in FIG. 2, the first layout 200 includes a first connector 202a and a second connector 202b (e.g., connectors 108 as shown in FIG. 1), collectively referred to as connectors 202. Each of the connectors 202 include three ports 204, 206, 208. A first wire 210 extends from port 204 of the first connector 202a to port 204 of the second connector 202b. The first wire 210 may also be connected to a first contact point 212. In embodiments, the port 204 of each of the connectors 202 may be coupled to a particular wire (e.g., the "neutral" wire) of a multi-wire electrical conductor. A second wire 214 extends from port 206 of the first connector 202a to port 206 of the second connector 202b. The second wire 214 may also be connected to one or more second contact points 216. As shown in FIG. 2, there are three second contact points 216. However, one of skill in the art will recognize that more or fewer second contact points may be used. In embodiments, the port 206 of each of the connectors 202 may be coupled to a particular wire (e.g., the "ground" wire) of a multi-wire electrical conductor. A third wire 218 extends from port 208 of the first connector 202a to port 208 of the second connector 202b. The third wire 218 may also be connected to a third contact point 220. In embodiments, the port 208 of each of the connectors 202 may be coupled to a particular wire (e.g., the "hot" wire) of a multi-wire electrical conductor. Each of the contact points 212, 216, 220 may be disposed in a location to be electrically connected to an electrical contact of an electrical receptacle 104, as discussed in more detail below. For example, one or more of the contact points 212, 216, 220 may be aligned with an aperture in the mounting bracket 102, such that electrical contact may be made between the electrical receptacle 104 and the embedded circuitry 112 at one or more of the contact points 212, 216, 220.

Figure 3:
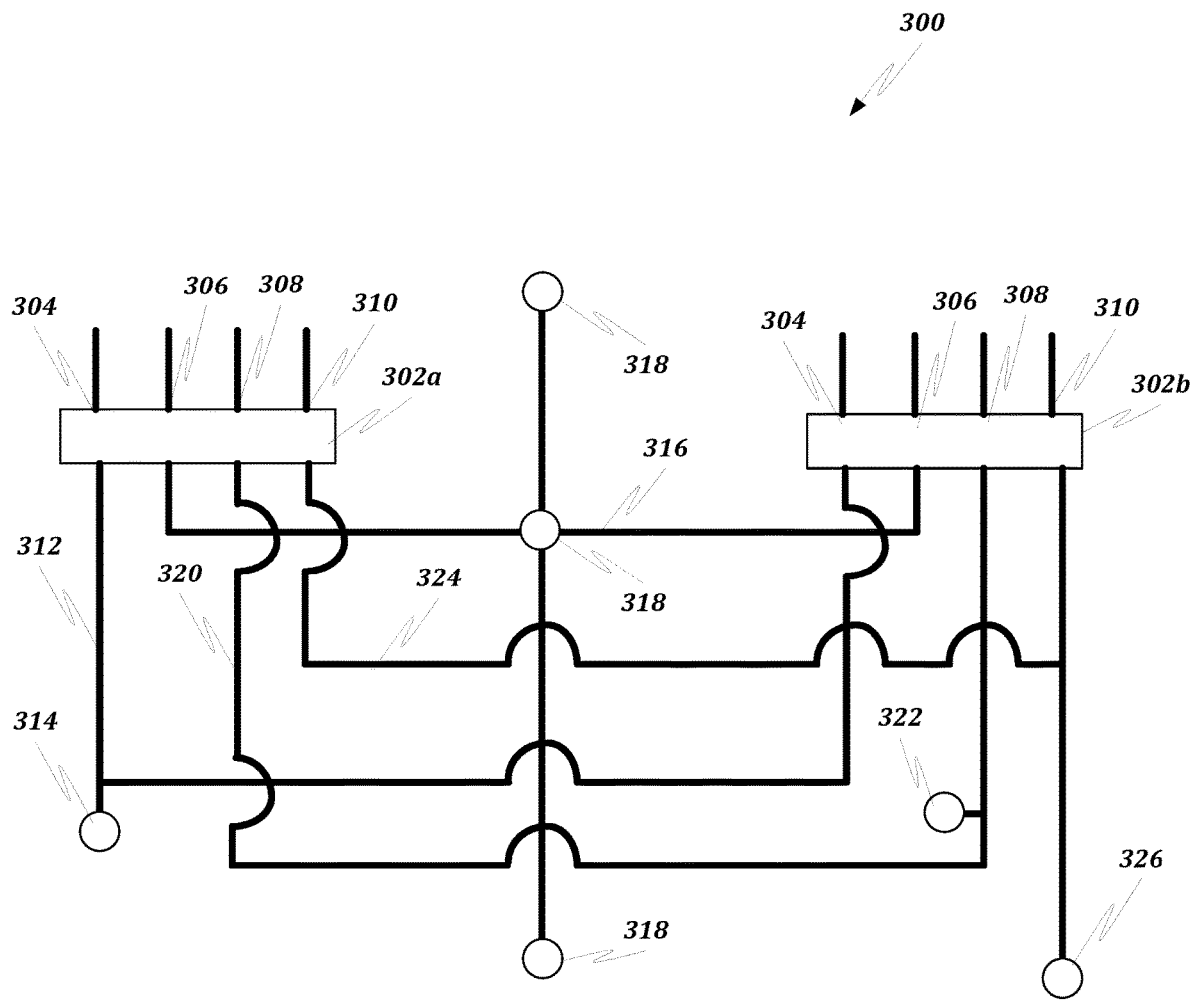

FIG. 3 shows a second schematic layout 300 of the embedded circuitry 112. The layout 300 is useful for a receptacle such as an outlet, where a switch controls at least a portion of the receptacle. As shown in FIG. 3, the second layout 300 includes a first connector 302a and a second connector 302b (e.g., connectors 108 as shown in FIG. 1), collectively referred to as connectors 302. Each of the connectors 302 include four ports 304, 306, 308, 310. A first wire 312 extends from port 304 of the first connector 302a to port 304 of the second connector 302b. The first wire 312 may also be connected to a first contact point 314. In embodiments, the port 304 of each of the connectors 302 may be coupled to a particular wire (e.g., the "neutral" wire) of a multi-wire electrical conductor. A second wire 316 extends from port 306 of the first connector 302a to port 306 of the second connector 302b. The second wire 316 may also be connected to one or more second contact points 318. As shown in FIG. 3, there are three second contact points 318. However, one of skill in the art will recognize that more or fewer second contact points may be used. In embodiments, the port 306 of each of the connectors 302 may be coupled to a particular wire (e.g., the "ground" wire) of a multi-wire electrical conductor. A third wire 320 extends from port 308 of the first connector 302a to port 308 of the second connector 302b. The third wire 320 may also be connected to a third contact point 322. In embodiments, the port 308 of each of the connectors 302 may be coupled to a particular wire (e.g., the "always hot" wire) of a multi-wire electrical conductor. A fourth wire 324 extends from port 310 of the first connector 302a to port 310 of the second connector 302b. The fourth wire 324 may also be connected to a fourth contact point 326. In embodiments, the port 310 of each of the connectors 302 may be coupled to a particular wire (e.g., the "switch controlled hot" wire or "second hot" wire) of a multi-wire electrical conductor. Each of the contact points 314, 318, 322, 326 may be disposed in a location to be electrically connected to an electrical contact of an electrical receptacle 104, as discussed in more detail below. For example, one or more of the contact points 314, 318, 322, 326 may be aligned with an aperture in the mounting bracket 102, such that electrical contact may be made between the electrical receptacle 104 and the embedded circuitry 112 at one or more of the contact points 314, 318, 322, 326.

Figure 4:
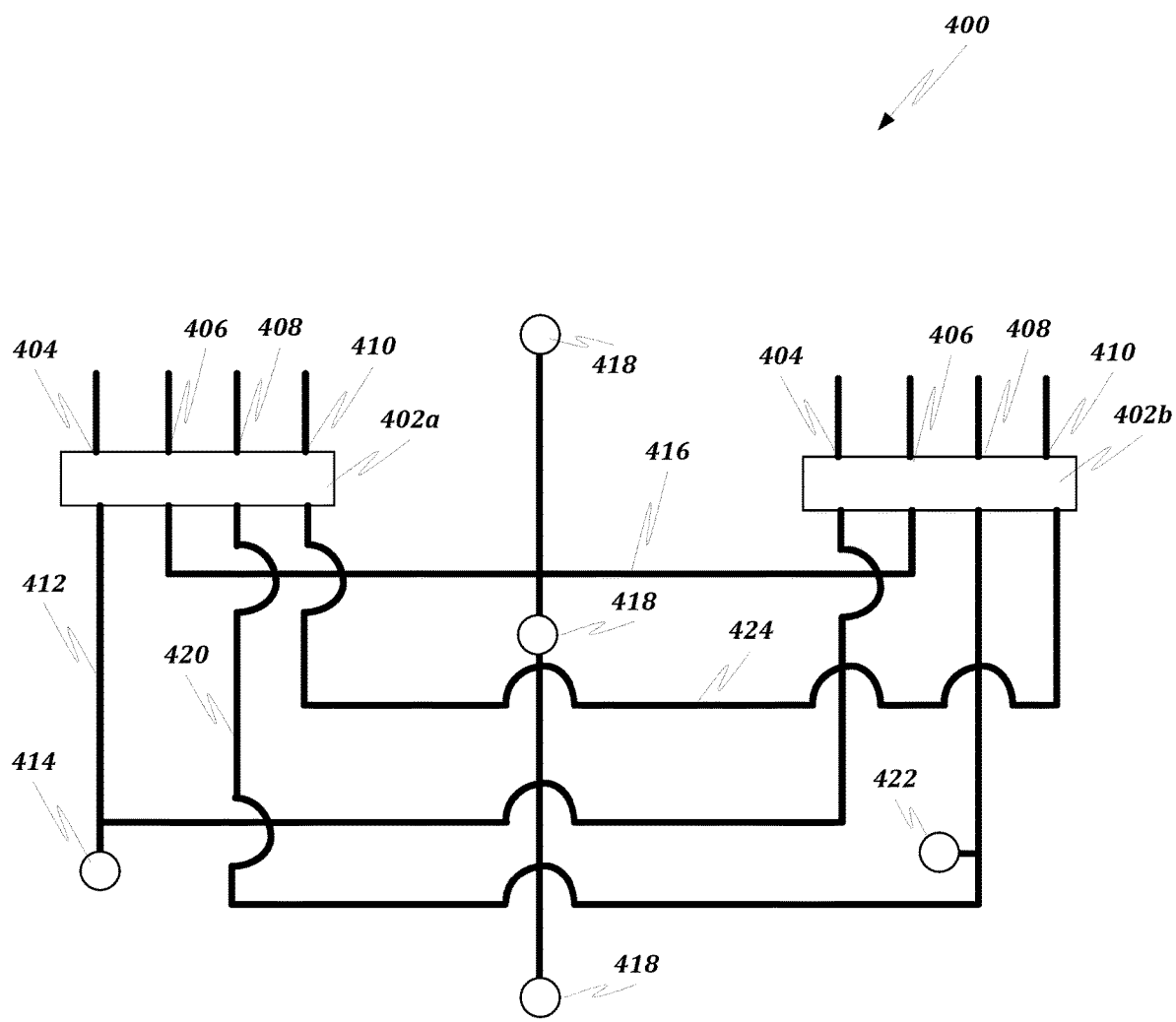

FIG. 4 shows a third schematic layout 400 of the embedded circuitry 112. The layout 400 is useful for a "normal" (e.g., non-switch-controlled) receptacle such as an outlet or switch installed "downstream" of a switch-controlled receptacle. As shown in FIG. 4, the third layout 400 includes a first connector 402a and a second connector 402b (e.g., connectors 108 as shown in FIG. 1), collectively referred to as connectors 402. Each of the connectors 402 include four ports 404, 406, 408, 410. A first wire 412 extends from port 404 of the first connector 402a to port 404 of the second connector 402b. The first wire 412 may also be connected to a first contact point 414. In embodiments, the port 404 of each of the connectors 402 may be coupled to a particular wire (e.g., the "neutral" wire) of a multi-wire electrical conductor. A second wire 416 extends from port 406 of the first connector 402a to port 406 of the second connector 402b. The second wire 416 may also be connected to one or more second contact points 418. As shown in FIG. 4, there are three second contact points 418. However, one of skill in the art will recognize that more or fewer second contact points may be used. In embodiments, the port 406 of each of the connectors 402 may be coupled to a particular wire (e.g., the "ground" wire) of a multi-wire electrical conductor. A third wire 420 extends from port 408 of the first connector 402a to port 408 of the second connector 402b. The third wire 420 may also be connected to a third contact point 422. In embodiments, the port 408 of each of the connectors 402 may be coupled to a particular wire (e.g., the "always hot" wire) of a multi-wire electrical conductor. A fourth wire 424 extends from port 410 of the first connector 402a to port 410 of the second connector 402b. The furth wire 424 may not be associated with a contact point in the layout 400. That is, the wire is not electrically connected to a receptacle 104 associated with the wiring layout 400. In embodiments, the port 410 of each of the connectors 402 may be coupled to a particular wire (e.g., the "switch controlled hot" wire or "second hot" wire) of a multi-wire electrical conductor. Each of the contact points 414, 418, 422 may be disposed in a location to be electrically connected to an electrical contact of an electrical receptacle 104, as discussed in more detail below. For example, one or more of the contact points 414, 418, 422 may be aligned with an aperture in the mounting bracket 102, such that electrical contact may be made between the electrical receptacle 104 and the embedded circuitry 112 at one or more of the contact points 414, 418, 422. Since there is no electrical connection between the electrical receptacle 104 and the fourth wire 424, the receptacle is "always hot" even though it is downstream from a switch-controlled receptacle.

Figure 5:
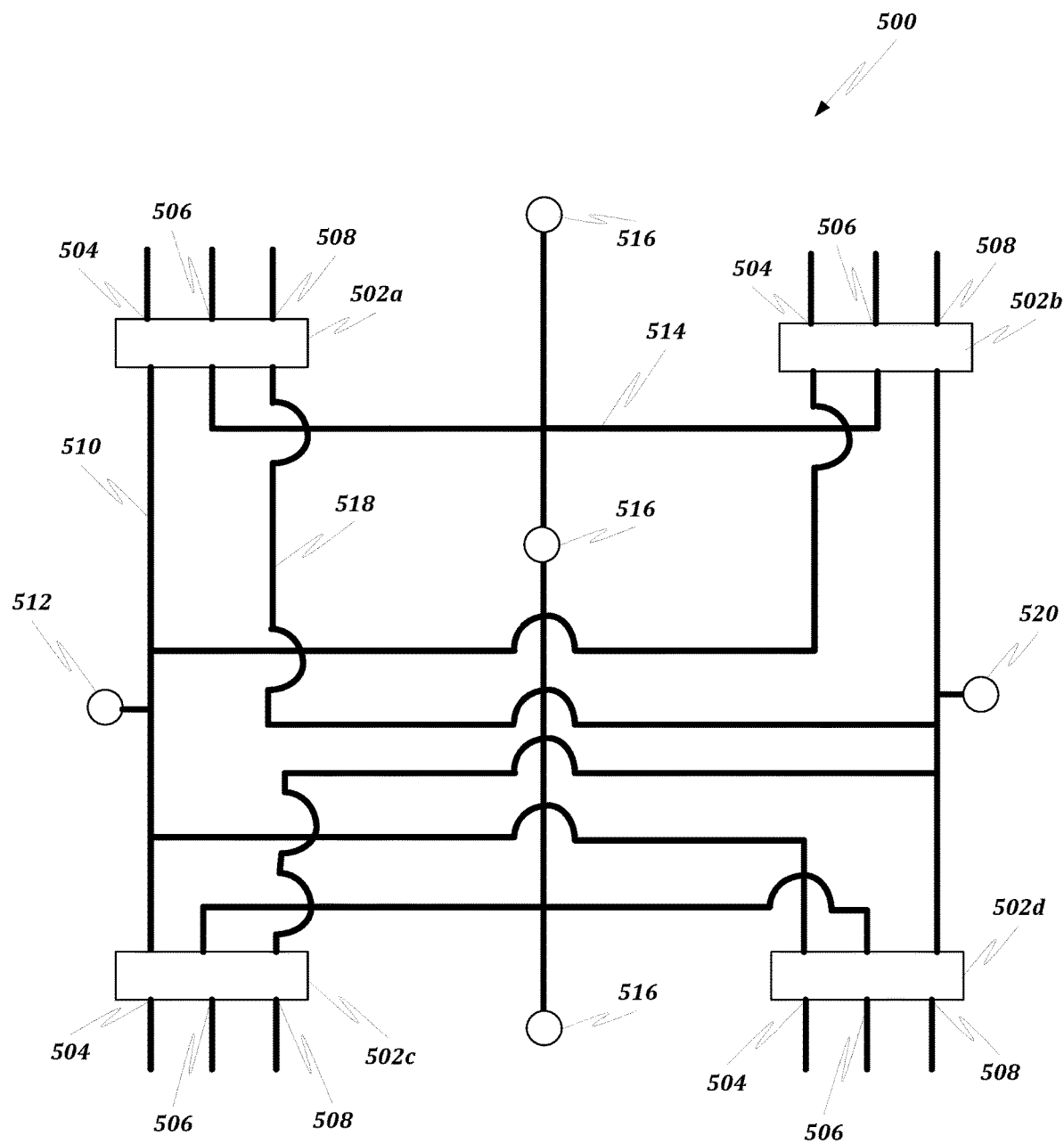

FIG. 5 shows a fourth schematic layout 500 of the embedded circuitry 112. The layout 500 is similar to the layout 200 described above, but includes additional connectors to facilitate additional branch circuits. As shown in FIG. 5, the fourth layout 500 includes a first connector 502a, a second connector 502b, a third connector 502c, and a fourth connector 502d (e.g., connectors 108 as shown in FIG. 1), collectively referred to as connectors 502. While layout 500 as shown include four connectors, it will be appreciated by those of skill in the art that more or fewer connectors may be used. Each of the connectors 502 includes three ports 504, 506, 508. A first wire 510 connects port 504 of the first connector 502a, port 504 of the second connector 502b, port 504 of the third connector 502c, and port 504 of the fourth connector 502d. The first wire 510 may also be connected to a first contact point 512. In embodiments, the port 504 of each of the connectors 502 may be coupled to a particular wire (e.g., the "neutral" wire) of a multi-wire electrical conductor. A second wire 514 connects port 506 of the first connector 502a, port 506 of the second connector 502b, port 506 of the third connector 502c, and port 506 of the fourth connector 502d. The second wire 514 may also be connected to one or more second contact points 516. As shown in FIG. 5, there are three second contact points 516. However, one of skill in the art will recognize that more or fewer contact points may be used. In embodiments, the port 506 of each of the connectors 502 may be coupled to a particular wire (e.g., the "ground" wire) of a multi-wire electrical conductor. A third wire 518 connects port 508 of the first connector 502a, port 508 of the second connector 502b, port 508 of the third connector 502c, and port 508 of the fourth connector 502d. The third wire 518 may also be connected to a third contact point 520. In embodiments, the port 508 of each of the connectors 502 may be coupled to a particular wire (e.g., the "hot" wire) of a multi-wire electrical conductor. Each of the contact points 512, 516, 520 may be disposed in a location to be electrically connected to an electrical contact of an electrical receptacle 104, as discussed in more detail below. For example, one or more of the contact points 512, 516, 520 may be aligned with an aperture in the mounting bracket 102, such that electrical contact may be made between the electrical receptacle 104 and the embedded circuitry 112 at one or more of the contact points 512, 516, 520.

Figure 6:
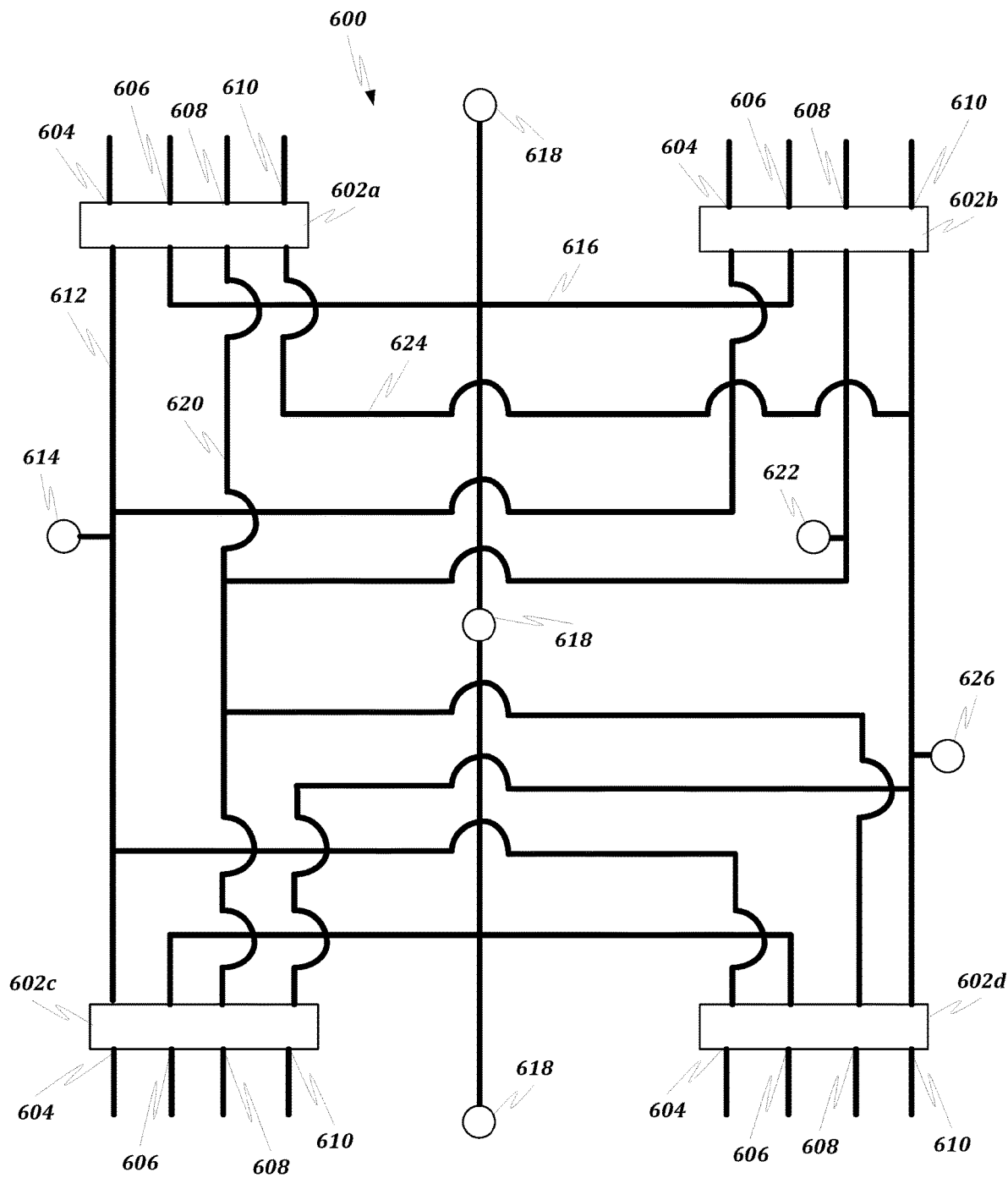

FIG. 6 shows a fifth schematic layout 600 of the embedded circuitry 112. The layout 600 is similar to layout 300 described above, but includes additional connectors to facilitate additional branch circuits. As shown in FIG. 6, the fifth layout 600 includes a first connector 602a, a second connector 602b, a third connector 602c, and a fourth connector 602d (e.g., connectors 108 as shown in FIG. 1), collectively referred to as connectors 602. While layout 600 as shown include four connectors, it will be appreciated by those of skill in the art that more or fewer connectors may be used. Each of the connectors 602 include four ports 604, 606, 608, 610. A first wire 612 connects port 604 of the first connector 602a, port 604 of the second connector 602b, port 604 of the third connector 602c, and port 604 of the fourth connector 602d. The first wire 312 may also be connected to a first contact point 614. In embodiments, the port 604 of each of the connectors 602 may be coupled to a particular wire (e.g., the "neutral" wire) of a multi-wire electrical conductor. A second wire 616 connects port 606 of the first connector 602a, port 606 of the second connector 602b, port 606 of the third connector 602c, and port 606 of the fourth connector 602d. The second wire 616 may also be connected to one or more second contact point 618. As shown in FIG. 6, there are three second contact points 618. However, one of skill in the art will recognize that more or fewer second contact points may be used. In embodiments, the port 606 of each of the connectors 602 may be coupled to a particular wire (e.g., the "ground" wire) of a multi-wire electrical conductor. A third wire 620 connects port 608 of the first connector 602a, port 608 of the third connector 602c, and port 608 of the fourth connector 602d. The third wire 620 may also be connected to a third contact point 622. In embodiments, the port 608 of each of the connectors 602 may be coupled to a particular wire (e.g., the "always hot" wire) of a multi-wire electrical conductor. A fourth wire 624 connects port 610 of the first connector 602a, port 610 of the second connector 602b, port 610 of the third connector 602c, and port 610 of the fourth connector 602d. The furth wire 624 may also be connected to a fourth contact point 626. In embodiments, the port 610 of each of the connectors 602 may be coupled to a particular wire (e.g., the "switch controlled hot" wire or "second hot" wire) of a multi-wire electrical conductor. Each of the contact points 614, 618, 622, 626 may be disposed in a location to be electrically connected to an electrical contact of an electrical receptacle 104, as discussed in more detail below. For example, one or more of the contact points 614, 618, 622, 626 may be aligned with an aperture in the mounting bracket 102, such that electrical contact may be made between the electrical receptacle 104 and the embedded circuitry 112 at one or more of the contact points 614, 618, 622, 626.

Figure 7:
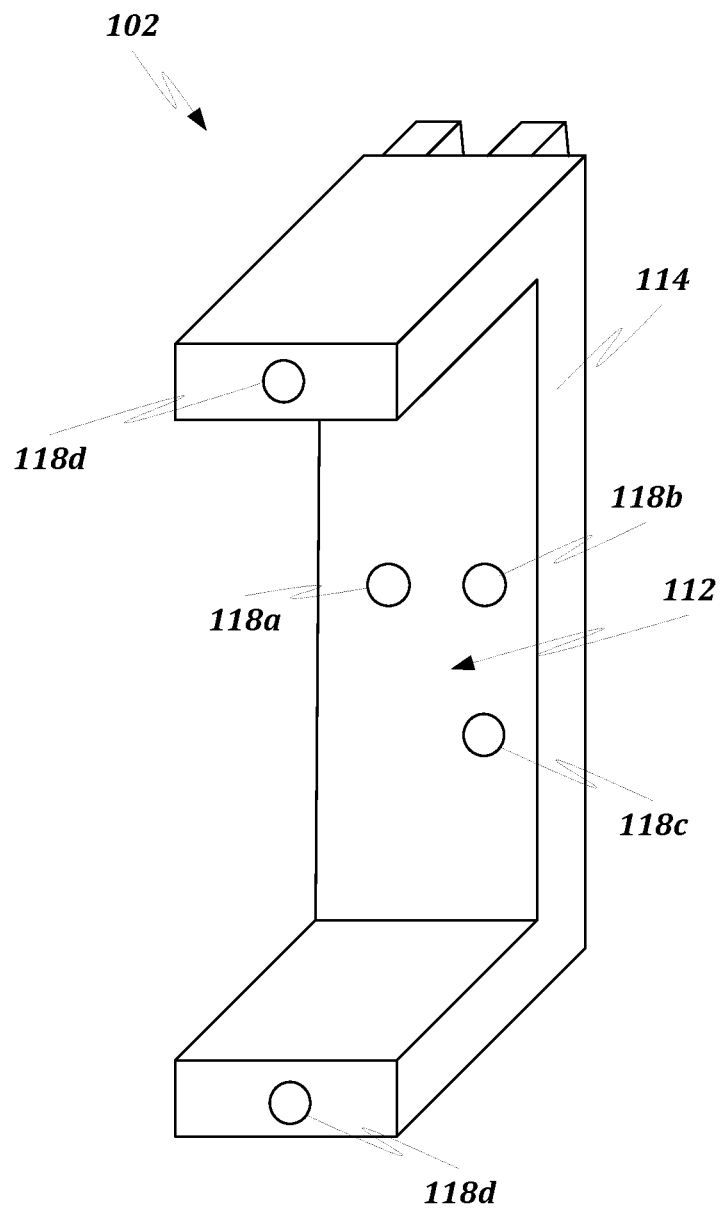

FIG. 7 shows a front perspective view of a mounting bracket 102. In embodiments, the mounting bracket includes a back portion 114 and support members 116 that define one or more apertures 118 for facilitating connection of electrical connections of the electrical receptacle 104 to the embedded circuitry 112 included in the mounting bracket 102. In particular, the back portion 114 may define a first aperture 118a for facilitating connection between an electrical receptacle (e.g., the electrical receptacle 104) and a contact point of the embedded circuitry 112 associated with a "neutral" wire in the electrical conductor, and a second aperture 118b for facilitating connection between an electrical receptacle (e.g., the electrical receptacle 104) and a contact point of the embedded circuitry 112 associated with a "hot" wire in the electrical conductor. Optionally, the back portion 114 may define a third aperture 118c for facilitating connection between the electrical receptacle 104 and a contact point of the embedded circuitry 112 associated with a "switch-controlled hot" or "second hot" wire in the electrical conductor. The support members 116 may each define a fourth aperture 118d for facilitating connection between an electrical receptacle (e.g., the electrical receptacle 104) and a contact point of the embedded circuitry 112 associated with a "ground" wire in the electrical conductor. The apertures 118 may be sized to allow a screw or other electrically conductive device from the electrical receptacle 104 to make contact with an electrical contact of the embedded circuitry 112, as will be discussed in more detail below. In embodiments, the fourth apertures 118d may be threaded to receive and retain a screw, thereby mounting the electrical receptacle 104 to the mounting bracket 102.

Returning now to FIG. 1, the self-contained boxless electrical receptacle system 100 further includes a receptacle 104. The receptacle is shown in greater detail in FIG. 8. As shown, the receptacle 104 includes a body 802 and one or more apertures 804a-d. In embodiments, the receptacle 104 may include internal conductors, as discussed in further detail below. In embodiments, the receptacle 104 may be self-contained and/or fully enclosed.

One or more (e.g., each) of the apertures 804a-d may be threaded to receive and retain a screw made from a conductive material. In particular, the receptacle 104 may include a center aperture 804d to secure a cover plate to the receptacle. In embodiments, the center aperture may retain a screw formed from a conductive material, and the screw may be in electrical contact with the embedded circuitry 112 associated with a "ground" wire in the electrical conductor.

Figure 8:
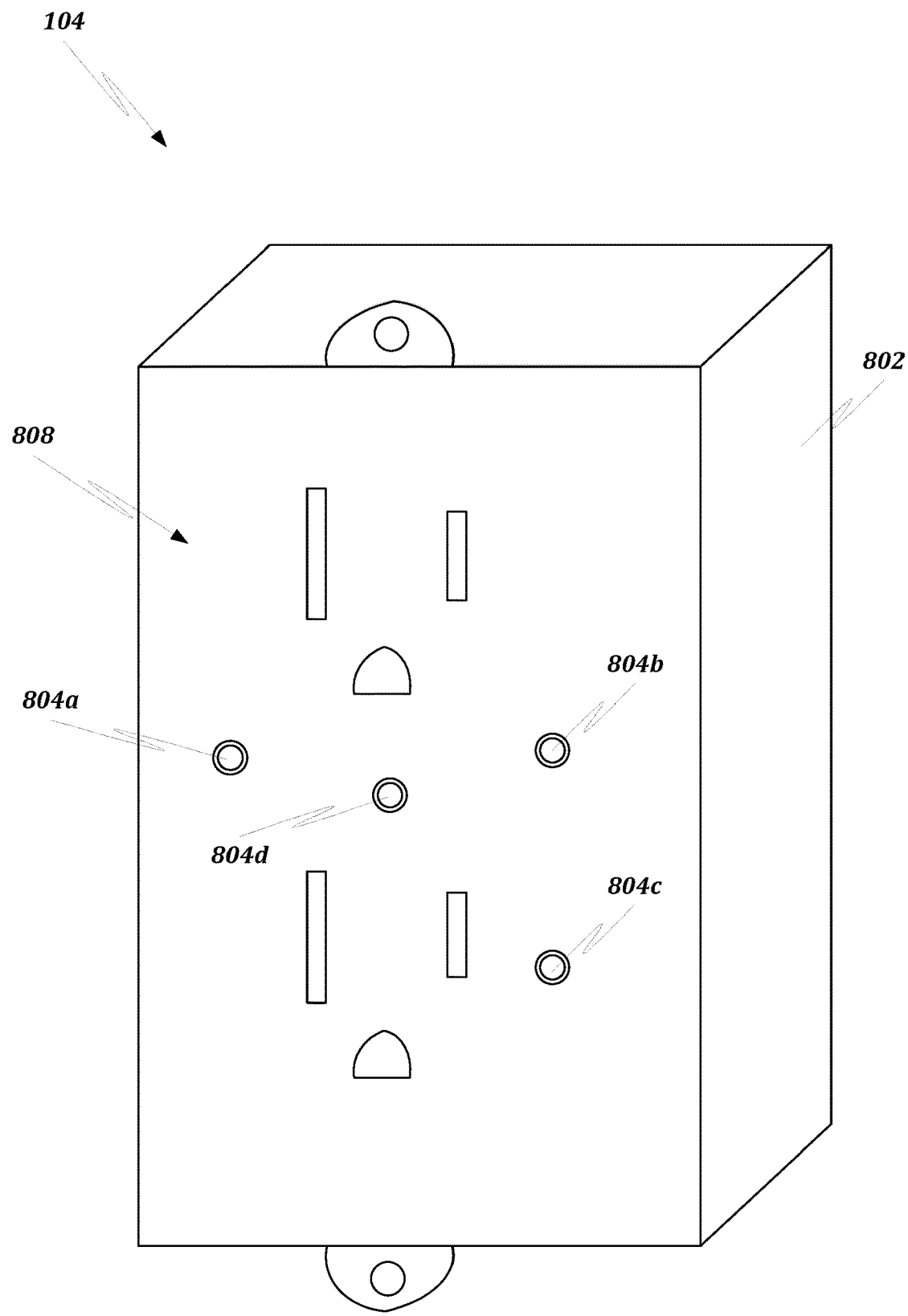

The body 802 is preferably formed from a non-conductive material, such as a plastic. The body 802 may have a front surface 808 that includes an electrical interface. As shown in FIG. 8, the electrical interface is that of an electrical socket, including two separate plugs for connecting a device that requires electricity to electrical power in a building. The electrical socket interface may be standardized. For Example, in the United States, the electrical socket may comply with the US National Electrical Manufacturers Association (NEMA) standards, such as NEMA 5-15R, 5-20R, 5-30R, 6-15R, 6-20R, 6-30R. The receptacle may also be configured according to other standards in other countries. For example, the receptacle may be compatible with British Standard BS 546 or BS 1363; Chinese Standards GB 20991-2008 and GB 1002-2008; Australia/New Zealand Standards AS/NZS 3112; or any other standards set forth in a country.

Figure 9:
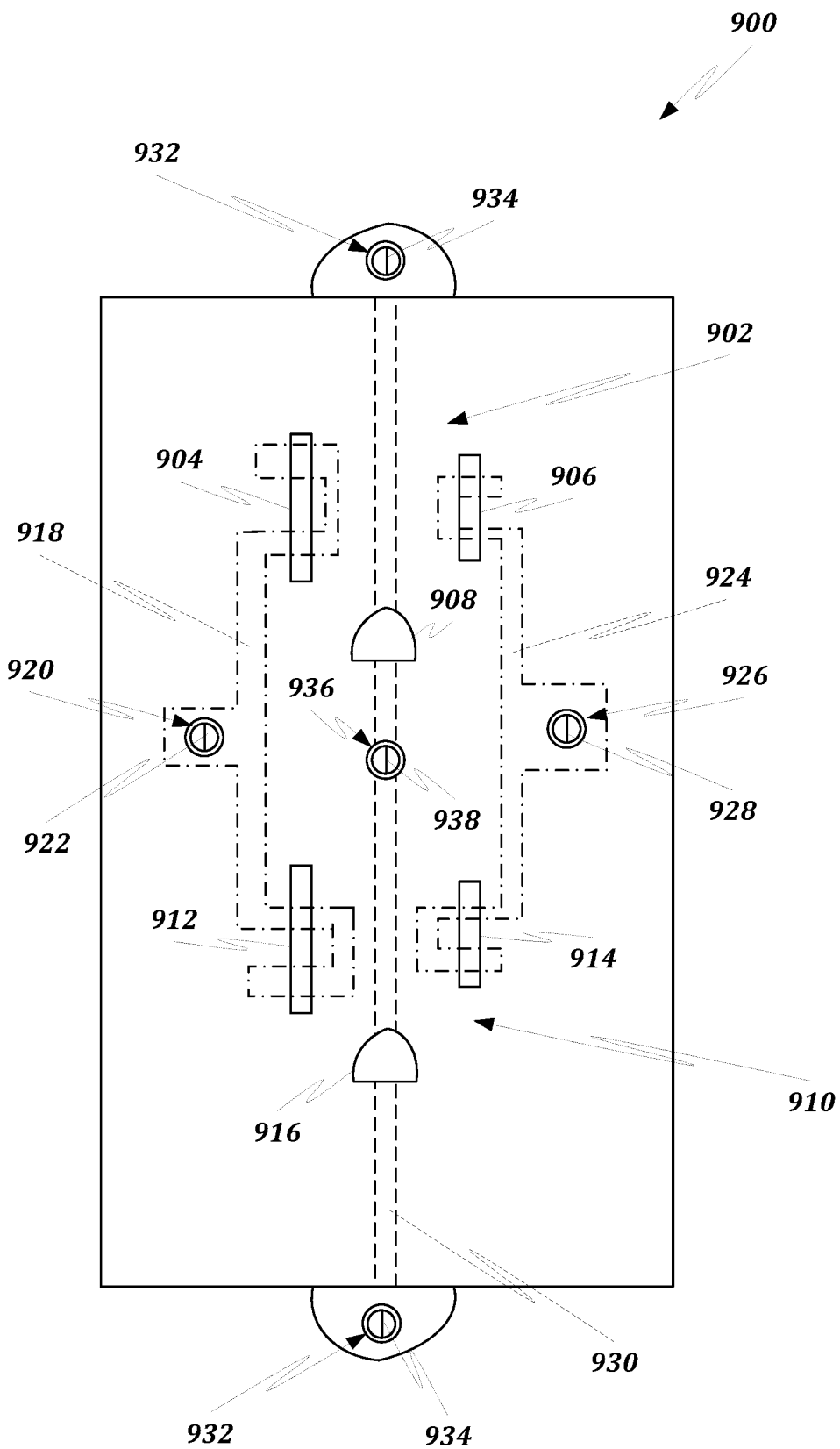

In embodiments, the receptacle 104 may include internal conductors. FIG. 9 shows a first configuration 900 of the internal conductors (shown hidden). The first configuration 900 may include a first grounded outlet 902, having a first neutral connector 904, a first hot connector 906, and a first ground connector 908. The first configuration 900 may further include a second grounded outlet 910, having a second neutral connector 912, a second hot connector 914, and a second ground connector 916.

A neutral conductor 918 may connect the first neutral connector 904 and the second neutral connector 912. A first aperture 920 may extend through the receptacle 104, and may be positioned such that the aperture exposes at least a portion of the neutral conductor 918. In embodiments, the first aperture is configured to receive and retain a first electrically conductive member (e.g., a metallic screw) 922. The first electrically conductive member 922 may contact the neutral conductor 912, and may extend rearward to the mounting bracket 102, to contact a portion of the embedded wiring 112 in the mounting bracket. In particular, the first electrically conductive member 922 may contact the embedded wiring 112 at an electrical contact associated with a neutral wire from among the wires in the multi-wire conductor (e.g., electrical contact 212, 414, or 512, as described above), so that the first neutral connector 904 and the second neutral conductor 912 are electrically connected to the neutral wire of the multi-wire conductor. In embodiments, the first aperture 920 may be counterbored, such that the first conductive member 922 is recessed with respect to a face of the receptacle 104. This helps to ensure that a user, such as a homeowner or electrician, will not accidentally contact the first conductive member 922.

A hot conductor 924 may connect the first hot connector 906 and the second hot connector 914. A second aperture 926 may extend through the receptacle 104, and may be positioned such that the aperture exposes at least a portion of the hot conductor 924. In embodiments, the second aperture is configured to receive and retain a second electrically conductive member (e.g., a metallic screw) 928. The second electrically conductive member 928 may contact the hot conductor 924, and may extend rearward to the mounting bracket 102, to contact a portion of the embedded wiring 112 in the mounting bracket. In particular, the second electrically conductive member 928 may contact the embedded wiring 112 at an electrical contact associated with a hot wire from among the wires in the multi-wire conductor (e.g., electrical contact 220, 422, or 522, as described above), so that the first hot connector 906 and the second hot conductor 914 are electrically connected to the hot wire of the multi-wire conductor. In embodiments, the second aperture 926 may be counterbored, such that the second conductive member 928 is recessed with respect to a face of the receptacle 104. This helps to ensure that a user, such as a homeowner or electrician, will not accidentally contact the second conductive member 928.

A ground conductor 930 may connect the first ground connector 908 and the second ground connector 916. At least one third aperture 932 may extend through the receptacle 104. In some embodiments, the at least one third aperture 932 may be formed as at least one attachment point for the receptacle 104. The at least one third aperture 932 may be positioned such that the aperture exposes at least a portion of the ground conductor 930. In embodiments, the at least one third aperture 932 is configured to receive and retain a third electrically conductive member (e.g., a metallic screw) 934. The third electrically conductive member 934 may contact the ground conductor 930, and may extend rearward, attaching the receptacle 104 to the mounting bracket 102, and contacting a portion of the embedded wiring 112 in the mounting bracket. In particular, the third electrically conductive member 936 may contact the embedded wiring 112 at an electrical contact associated with a ground wire from among the wires in the multi-wire conductor (e.g., electrical contact 216, 418, or 518, as described above), so that the first ground connector 908 and the second ground conductor 916 are electrically connected to the ground wire of the multi-wire conductor.

In some embodiments, another aperture 936 may extend through the receptacle 104. In some embodiments, the aperture 936 may be positioned such that the aperture exposes at least a portion of the ground conductor 930. In embodiments, the aperture 936 is configured to receive and retain another electrically conductive member (e.g., a metallic screw) 938. The electrically conductive member 938 may contact the ground conductor 930, and may extend rearward, contacting a portion of the embedded wiring 112 in the mounting bracket. In particular, the electrically conductive member 938 may contact the embedded wiring 112 at an electrical contact associated with a ground wire from among the wires in the multi-wire conductor (e.g., electrical contact 216, 418, or 518, as described above), so that the first ground connector 908 and the second ground conductor 916 are electrically connected to the ground wire of the multi-wire conductor.

Figure 10:
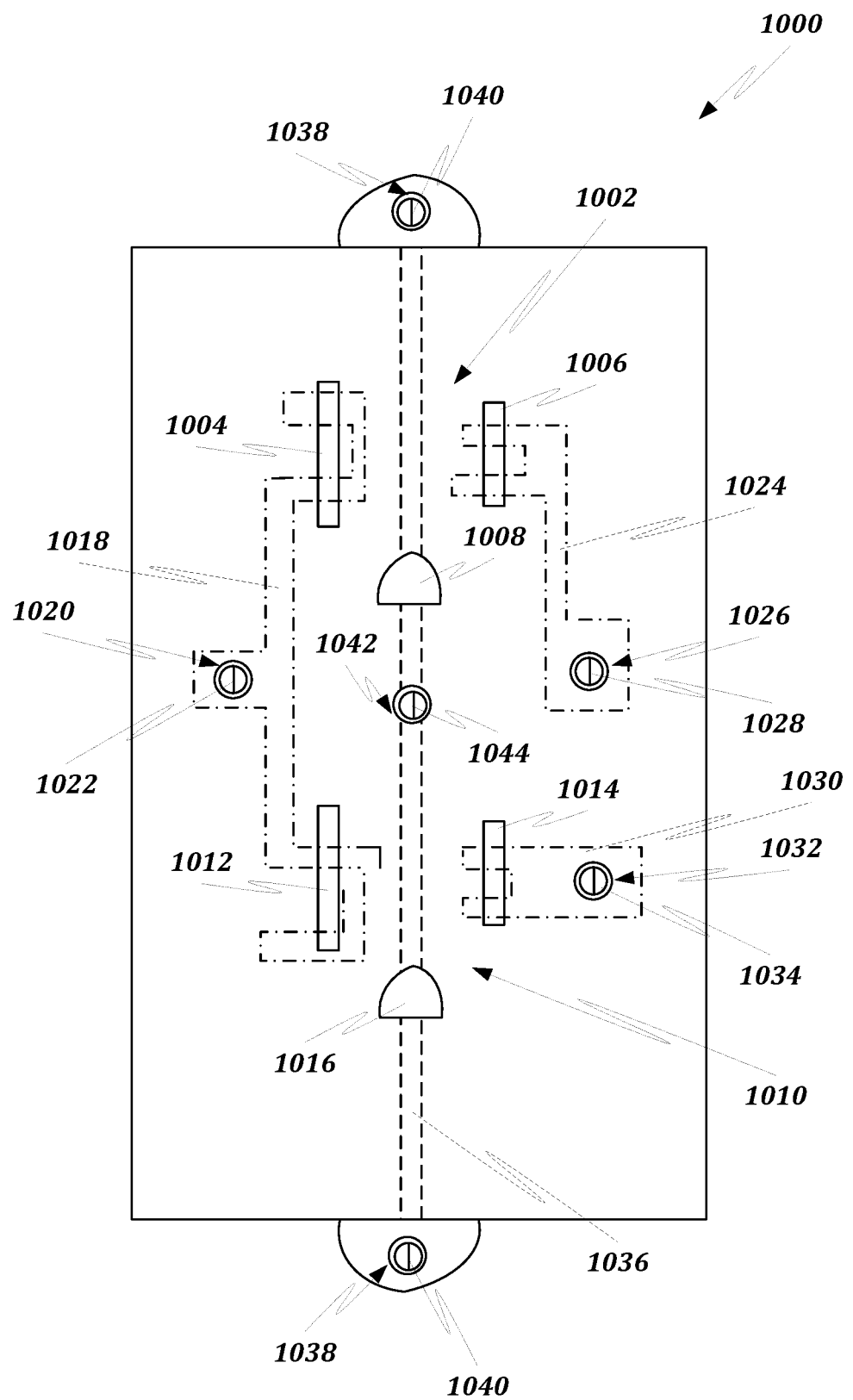

FIG. 10 shows a second configuration 1000 of the internal conductors of the receptacle 104 (shown hidden). The second configuration 1000 may include a first grounded outlet 1002 that is not controlled by a switch, having a first neutral connector 1004, a first hot connector 1006, and a first ground connector 1008. The second configuration 1000 may further include a second grounded outlet 1010 that is controlled by a switch upstream of the receptacle 104, the second grounded outlet having a second neutral connector 1012, a second hot connector 1014, and a second ground connector 1016.

A neutral conductor 1018 may connect the first neutral connector 1004 and the second neutral connector 1012. A first aperture 1020 may extend through the receptacle 104, and may be positioned such that the aperture exposes at least a portion of the neutral conductor 1018. In embodiments, the first aperture 1020 is configured to receive and retain a first electrically conductive member (e.g., a metallic screw) 1022. The first electrically conductive member 1022 may contact the neutral conductor 1012, and may extend rearward to the mounting bracket 102, to contact a portion of the embedded wiring 112 in the mounting bracket. In particular, the first electrically conductive member 1022 may contact the embedded wiring 112 at an electrical contact associated with a neutral wire from among the wires in the multi-wire conductor (e.g., electrical contact 314 or 614, as described above), so that the first neutral connector 1004 and the second neutral conductor 1012 are electrically connected to the neutral wire of the multi-wire conductor. In embodiments, the first aperture 1020 may be counterbored, such that the first conductive member 1022 is recessed with respect to a face of the receptacle 104. This helps to ensure that a user, such as a homeowner or electrician, will not accidentally contact the first conductive member 1022.

A first hot conductor 1024 may extend from the first hot connector 1006. A second aperture 1026 may extend through the receptacle 104, and may be positioned such that the aperture exposes at least a portion of the first hot conductor 1024. In embodiments, the second aperture 1026 is configured to receive and retain a second electrically conductive member (e.g., a metallic screw) 1028. The second electrically conductive member 1028 may contact the first hot conductor 1024, and may extend rearward to the mounting bracket 102, to contact a portion of the embedded wiring 112 in the mounting bracket. In particular, the second electrically conductive member 1028 may contact the embedded wiring 112 at an electrical contact associated with a hot wire from among the wires in the multi-wire conductor (e.g., electrical contact 322, or 622, as described above), so that the first hot connector 1006 is electrically connected to the hot wire of the multi-wire conductor. In embodiments, the second aperture 1026 may be counterbored, such that the second conductive member 1028 is recessed with respect to a face of the receptacle 104. This helps to ensure that a user, such as a homeowner or electrician, will not accidentally contact the second conductive member 1028.

A second hot conductor 1030 may extend from the second hot connector 1014. A third aperture 1032 may extend through the receptacle 104, and may be positioned such that the third aperture 1032 exposes at least a portion of the second hot conductor 1030. In embodiments, the third aperture 1032 is configured to receive and retain a third electrically conductive member (e.g., a metallic screw)

1034. The third electrically conductive member 1034 may contact the second hot conductor 1030, and may extend rearward to the mounting bracket 102, to contact a portion of the embedded wiring 112 in the mounting bracket. In particular, the third electrically conductive member 1034 may contact the embedded wiring 112 at an electrical contact associated with a hot wire from among the wires in the multi-wire conductor (e.g., electrical contact 326, or 626, as described above), so that the second hot connector 1014 is electrically connected to the second hot wire or switched hot wire of the multi-wire conductor. In this way, the second grounded outlet may be controlled by an upstream switch. In embodiments, the third aperture 1032 may be counterbored, such that the third conductive member 1034 is recessed with respect to a face of the receptacle 104. This helps to ensure that a user, such as a homeowner or electrician, will not accidentally contact the third conductive member 1034.

A ground conductor 1036 may connect the first ground connector 1008 and the second ground connector 1016. At least one fourth aperture 1038 may extend through the receptacle 104. In some embodiments, the at least one fourth aperture 1038 may be formed as at least one attachment point for the receptacle 104. The at least one fourth aperture 1038 may be positioned such that the aperture exposes at least a portion of the ground conductor 1036. In embodiments, the at least one fourth aperture 1038 is configured to receive and retain a fourth electrically conductive member (e.g., a metallic screw) 1040. The fourth electrically conductive member 1040 may contact the ground conductor 1036, and may extend rearward, attaching the receptacle 104 to the mounting bracket 102, and contacting a portion of the embedded wiring 112 in the mounting bracket. In particular, the fourth electrically conductive member 1040 may contact the embedded wiring 112 at an electrical contact associated with a ground wire from among the wires in the multi-wire conductor (e.g., electrical contact 216, 418, or 518, as described above), so that the first ground connector 1008 and the second ground conductor 1016 are electrically connected to the ground wire of the multi-wire conductor.

In some embodiments, another aperture aperture 1042 may extend through the receptacle 104. In some embodiments, the aperture 1042 may be positioned such that the aperture exposes at least a portion of the ground conductor 1036. In embodiments, the aperture 1042 is configured to receive and retain another electrically conductive member (e.g., a metallic screw) 1044. The electrically conductive member 1044 may contact the ground conductor 1036, and may extend rearward, contacting a portion of the embedded wiring 112 in the mounting bracket. In particular, the electrically conductive member 1044 may contact the embedded wiring 112 at an electrical contact associated with a ground wire from among the wires in the multi-wire conductor (e.g., electrical contact 216, 418, or 518, as described above), so that the first ground connector 1008 and the second ground conductor 1016 are electrically connected to the ground wire of the multi-wire conductor.

Returning now to FIG. 1, the self-contained boxless electrical receptacle system 100 optionally includes a control module 106. As shown in FIG. 1, the control module 106 may be disposed between the mounting bracket 102 and the receptacle 104.

Figure 11:
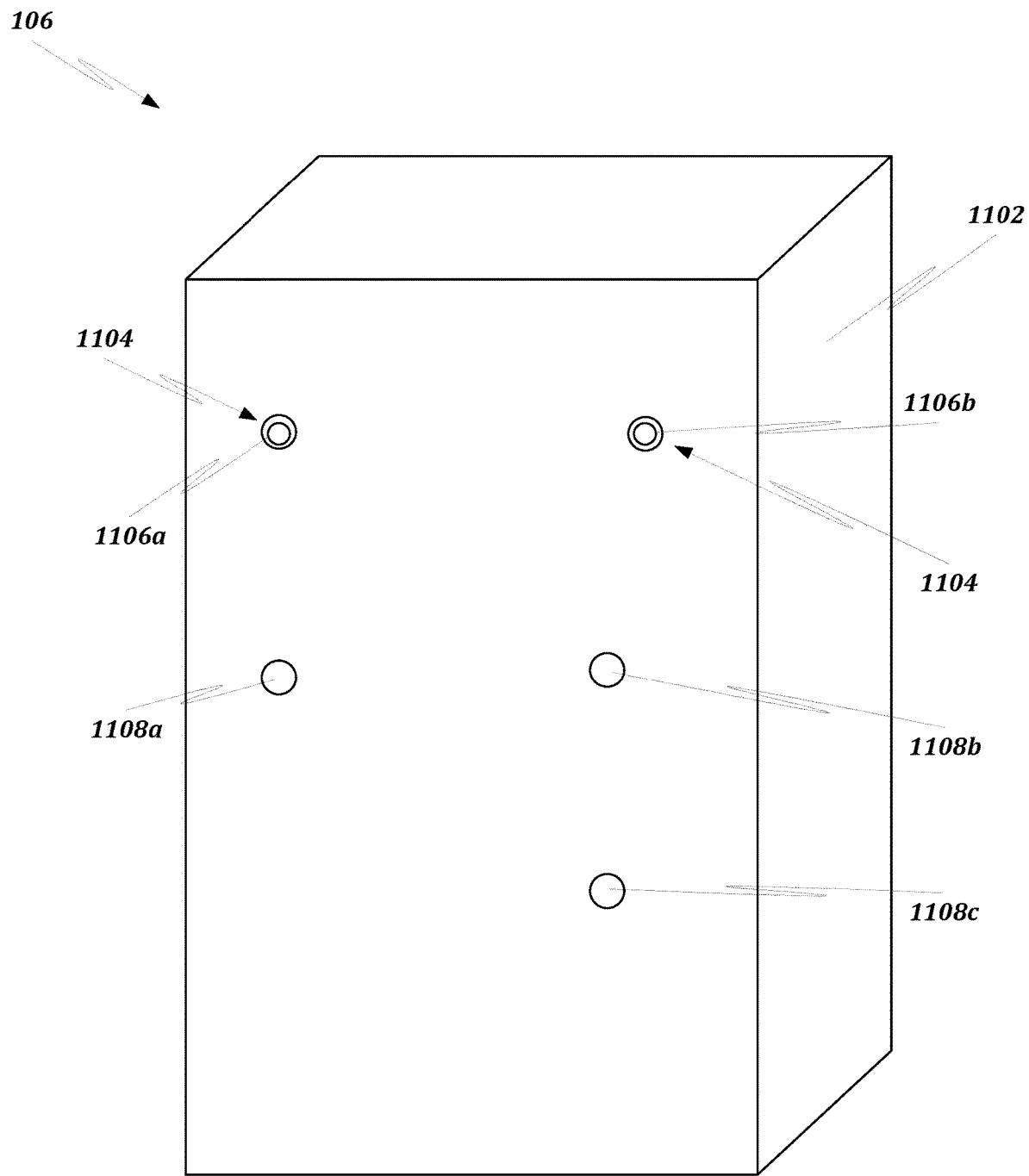

The control module 106 is shown in greater detail in FIG. 11. As shown, the control module 106 may include a body 1102, one or more apertures 1104, one or more electrical input contacts 1106 and one or more electrical output contacts 1108. The control module 106 may be used to control one or more properties of the receptacle 104. For example, the control module 106 may be used as a "virtual switch" for enabling or disabling flow of electricity to one or more of the outlets included in the receptacle 104 based on, for example, a user command, a time of day, a location of a user, or the like. There are many ways a receptacle 104 may be controlled by a control module 106. As another example, the control module 106 may be used as a dimmer, adjusting current flow to at least a portion of a receptacle. In embodiments, the control module 106 may include internal conductors, as discussed in further detail below. In embodiments, the body 1102 may be formed from a non-conductive material, such as plastic.

In embodiments, the electrical input contacts 1106 may include a neutral electrical input contact 1106a and a hot electrical input contact 1106b. The neutral electrical input contact 1106a may be connected to a neutral wire from a multi-wire conductor in the building electrical system. For example, the neutral electrical input contact 1106a may correspond to an aperture in the control module 106. The aperture may be disposed such that at least a portion of the neutral electrical input contact 1106a may be exposed, and a screw or other electrically conductive member may electrically connect the neutral input contact 1106a to the neutral wire of the multi-wire conductor. The hot electrical input contact 1106b may be connected to a hot wire from a multi-wire conductor in the building electrical system. For example, the hot electrical input contact 1006b may correspond to an aperture in the control module 106. The aperture may be disposed such that at least a portion of the hot electrical input contact 1106b may be exposed, and a screw or other electrically conductive member may electrically connect the hot input contact 1106b to the hot wire of the multi-wire conductor. The control module 106 may be powered using electricity from the electrical input contacts 1106.

As shown in FIG. 11, the output electrical contacts 1108 may include a neutral output electrical contact 1108a, a first hot output electrical contact 1108b, and a second hot output electrical contact 1108c. Those of skill in the art will recognize that more or fewer output electrical contacts may be used. In embodiments, positions of the output contacts may be selected to match positions of the electrical contacts in the mounting bracket 102. As a particular example, the positions of contacts 1108a, 1108b, and 1108c may match those of contacts 314, 322, and 326, as discussed above.

Figure 12:
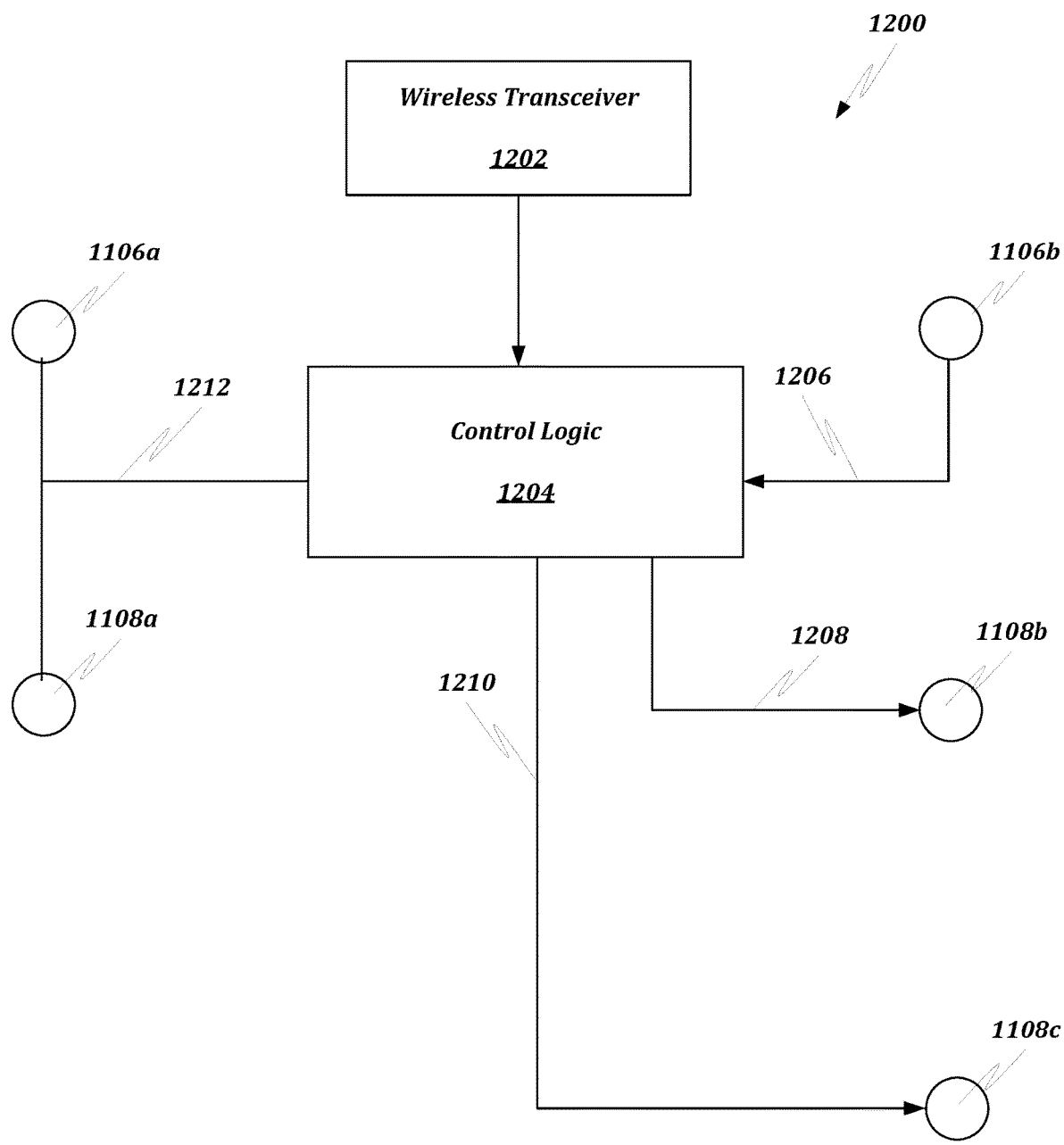

FIG. 12 shows a schematic illustration of a layout 1200 for the electronics of the control module 106. The layout 1200 may be retained at least partially within the body 1102 of the control module 106. In embodiments, the layout 1200 comprises a wireless transceiver 1202 and control circuitry 1204.

The wireless transceiver 1202 may be configured to receive commands from a computing device, such as a smartphone, tablet, personal computer, and/or home automation hub. In embodiments, the commands may be received wirelessly using, for example a wireless local area network signal as defined by the Institute for Electrical and Electronic Engineers (IEEE) 802.11 standards. Additionally or alternatively, the wireless transceiver may receive wireless signals using a personal area network as defined by IEEE 802.15 standards, such as a Bluetooth network or Zigbee network.

The control logic 1204 receives, as a control input, signals from the wireless transceiver 1202. The control logic 1204 may also receive as inputs, electrical connections from one or more of the electrical contacts 1106. As shown in FIG. 12, input circuitry 1206 provides the control logic 1204 with input from the hot electrical contact 1106b. The control logic 1204 may control one or more output signals based on the control input received from the wireless transceiver 1202. As shown in FIG. 12, the layout 1200 may include first output 1208 and a second output 1210. The first output 1208 may be connected to the first hot output electrical contact 1108b for facilitating electrical connection to a first outlet in the receptacle 104. The second output 1210 may be connected to the second hot output contact 1108c for facilitating electrical connection to a second outlet of the receptacle 104. In this way, the two outlets may be controlled independently.

In embodiments, an output circuit 1212 may connect the neutral electrical input connection 1106a and the neutral electrical output connection 1108a. The circuit 1212 may optionally be controlled by the control logic 1204. Alternatively, As is shown in FIG. 12, the circuit 1212 may provide a signal directly from the input connection 1106a to the output connection 1108a.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

CLAIMS

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

Although very narrow claims are presented herein, it should be recognized the scope of this disclosure is much broader than presented by the claims. It is intended that broader claims will be submitted in an application that claims the benefit of priority from this application.

The following is claimed:

1. A system, comprising:
   a mounting bracket mounted to a building structure and electrically connected to a building power supply including a neutral wire, a hot wire, and a ground wire, the mounting bracket including embedded electrical circuitry comprising:
   a first electrical contact electrically connected to the neutral wire of the building power supply,
   a second electrical contact electrically connected to the hot wire of the building power supply, and
   a third electrical contact electrically connected to the ground wire of the building power supply; and
   a self-contained receptacle attached to the mounting bracket, the self-contained receptacle having at least a first outlet and a second outlet, and having internal conductors comprising:
   an internal neutral conductor electrically connected to one or more of the first outlet and the second outlet,
   an internal hot conductor electrically connected to one or more of the first outlet and the second outlet, and
   an internal ground conductor electrically connected to one or more of the first outlet and the second outlet;
   wherein the self-contained receptacle defines a first aperture exposing a portion of the internal neutral conductor, the first aperture being configured to receive and retain a first conductive member for electrically connecting the internal neutral conductor of the self-contained receptacle and the first electrical contact of the mounting bracket, wherein the first aperture is counterbored such that the first conductive member is recessed relative to a face of the self-contained receptacle, and
   wherein the self-contained receptacle defines a second aperture exposing a portion of the internal hot conductor, the second aperture configured to receive and retain a second conductive member for electrically connecting the internal hot conductor of the self-contained receptacle and the second electrical contact of the mounting bracket, wherein the second aperture is counterbored such that the second conductive member is recessed relative to the face of the self-contained receptacle.

2. The system of claim 1, wherein the building power supply comprises a three-wire conductor, and wherein the mounting bracket comprises a clip for retaining each of the three wires and electrically connecting each of the three wires to the embedded electrical circuitry.

3. The system of claim 1, wherein the building power supply includes a second hot wire, the embedded electrical circuitry of the mounting bracket further comprising a fourth electrical contact electrically connected to the second hot wire of the building power supply.

4. The system of claim 3, wherein the internal hot conductor is electrically connected to the first outlet, and wherein the self-contained receptacle further comprises a second internal hot conductor electrically connected to the second outlet,
   wherein the self-contained receptacle defines a third aperture exposing a portion of the second internal hot conductor, the third aperture configured to receive and retain a third conductive member for electrically connecting the second internal hot conductor of the self-contained receptacle and the fourth electrical contact of the mounting bracket, wherein the third aperture is counterbored such that the third conductive member is recessed relative to the face of the self-contained receptacle.

5. The system of claim 1, the self-contained receptacle further comprising one or more attachment points for attaching the self-contained receptacle to the mounting bracket, each of the one or more attachment points being configured to receive a screw, and the mounting bracket being configured to receive and retain the screw.

6. The system of claim 5, wherein the one or more attachment points are formed from metal, and wherein the one or more attachment points are electrically connected to the internal ground conductor.

7. The system of claim 6, where the screw is formed from an electrically conductive material, and wherein the screw is electrically connected to the third electrical contact of the mounting bracket.

8. The system of claim 1, wherein the mounting bracket is formed from an electrically insulating material.

9. The system of claim 1, further comprising a control module for controlling an electrical output of at least one of the first outlet and the second outlet.

10. The system of claim 9, wherein the control module is configured to wirelessly receive instructions for controlling the electrical output of at least one of the first outlet and the second outlet.

11. The system of claim 9, wherein the control module is configured to independently control the electrical output of the first outlet and the electrical output of the second outlet.

12. The System of claim 9, wherein the control module is disposed between the self-contained receptacle and the mounting bracket.

13. The system of claim 1, wherein at least one of the neutral wire, the hot wire, and the ground wire is a 12-gauge wire.

14. The system of claim 1, wherein the self-contained receptacle complies with at least one of United States National Electrical Manufacturers Association (NEMA) standards 5-15R, 5-20R, 5-30R, 6-15R, 6-20R, and 6-30R.

15. The system of claim 1, wherein each of the first conductive member second and the second conductive member comprises a metallic screw.

* * * * *